United States Patent [19]

Woo

[11] Patent Number: 5,821,654
[45] Date of Patent: Oct. 13, 1998

[54] BEARING SUPPORT FOR CYLINDRICAL ROTATING SHAFT BEARING

[75] Inventor: Suk Ha Woo, Kyunggi-Do, Rep. of Korea

[73] Assignee: Samsung Electro-Mechanics Co., Ltd., Kyunggi-do, Rep. of Korea

[21] Appl. No.: 518,504

[22] Filed: Aug. 23, 1995

[30] Foreign Application Priority Data

Aug. 23, 1994 [KR] Rep. of Korea ............ 1994 21230 U

[51] Int. Cl.[6] .................................................. H02K 5/16
[52] U.S. Cl. ......................... 310/90; 310/90; 310/67 R; 310/43; 310/91; 384/204
[58] Field of Search .................. 310/90, 67 R, 310/91; 384/204, 206, 441

[56] References Cited

U.S. PATENT DOCUMENTS

| | | | |
|---|---|---|---|
| 2,421,592 | 6/1947 | Bergman | 310/91 |
| 3,483,407 | 12/1969 | Frohmüller et al. | 310/67 R |
| 4,117,359 | 9/1978 | Wehde | 310/67 R |
| 4,471,250 | 9/1984 | Snider | 310/67 R |
| 4,591,276 | 5/1986 | Schneider et al. | 384/203 |
| 5,405,199 | 4/1995 | Mabuchi et al. | 310/90 |

FOREIGN PATENT DOCUMENTS

| | | | |
|---|---|---|---|
| 0633646 | 6/1994 | European Pat. Off. | H02K 5/173 |
| 1585337 | 2/1981 | United Kingdom | F16C 23/00 |

*Primary Examiner*—Thomas M. Dougherty
*Assistant Examiner*—B. Mullins
*Attorney, Agent, or Firm*—Lowe, Price, LeBlanc & Becker

[57] ABSTRACT

A brushless motor having a plurality of weight reducing holes is disclosed. The weight reducing holes are formed in the thick parts of the stator housing of the motor to prevent shrinkage of the thick parts of the housing when forming the housing through injection molding. The weight reducing holes are formed in the housing by appropriately positioning cores in the mold before injecting melted resin into the mold. The weight reducing holes are formed in a bearing seat mouth of the housing as well as in an outer portion of the mouth.

8 Claims, 2 Drawing Sheets

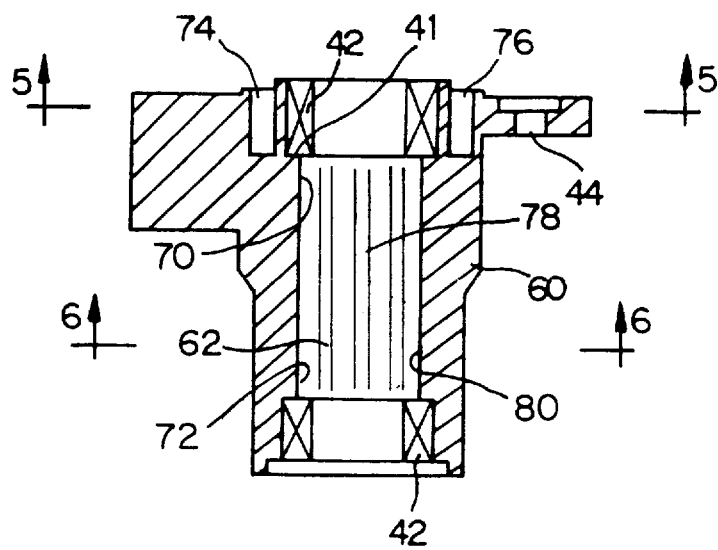
FIG. 4
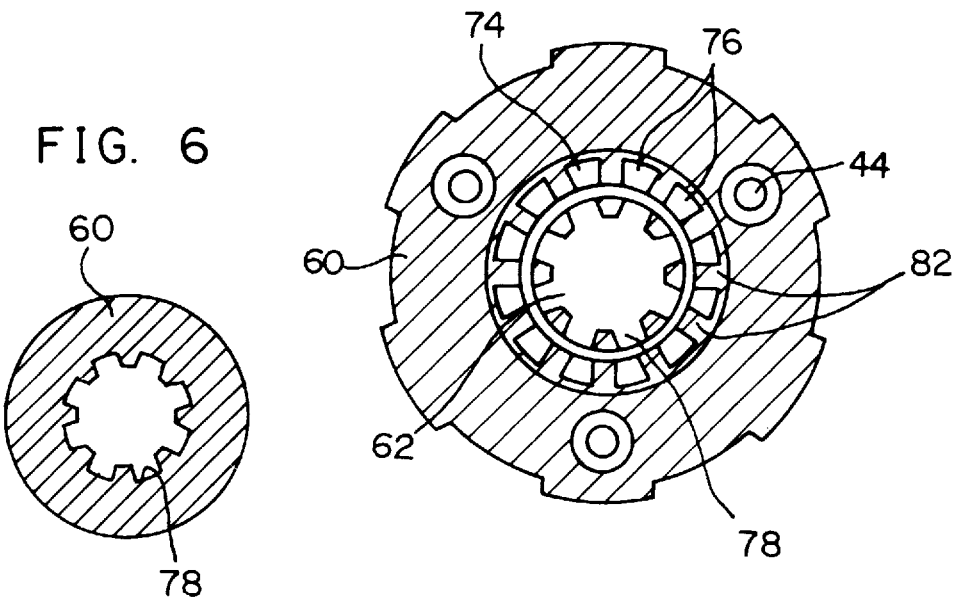
FIG. 5
FIG. 6

BEARING SUPPORT FOR CYLINDRICAL ROTATING SHAFT BEARING

BACKGROUND OF THE INVENTION

1. Field of the Invention

The present invention relates in general to a bearing support for a cylindrical rotating shaft bearing for preventing partial deformation of the stator housing due to difference in cooling time and shrinkage between thick and thin parts of the housing during formation by injection molding.

2. Description of the Prior Art

As well known to those skilled in the art, brushless motors are suitable for use as, for example, capstan motors of camera recorders or video tape recorders. Each typical brushless motor is provided with a stator housing for receiving a rotating shaft therein. Such a housing of the brushless motor may be produced through die casting which provides highly precise dimensions for the housing. However, die casting is problematic because housing formed by this process is expensive. In order to overcome the above problem caused by the die casting, the stator housing may be formed through injection molding. However, injection molding has a problem in that the dimensions of a housing formed by this process are not sufficiently precise to install motor parts, such as bearings, in the housing. That is, the stator housing formed by injection molding may be partially deformed due to differences in both cooling time and shrinkage between thick parts and thin parts of the housing when cooling the resin in the mold. In order to solve this problem, the injection molding for forming the stator housing may be processed very slowly. However, this causes a problem in that the injection molding time is inevitably lengthened and thereby deteriorates productivity of the stator housings.

Referring to FIGS. 1 to 3, there is shown a typical brushless motor which may be preferably used as a capstan motor of a camera recorder or video tape recorder.

As shown in FIG. 1, a rotor case 10 of the brushless motor includes two magnets, that is, a main magnet 12 and a frequency generating magnet 14. The two magnets 12 and 14 are provided on the inner and outer surfaces of the rotor case 10 respectively. A rotating shaft 16 is fitted into the center of the rotor case 10 with a bush 18 interposed between the case 10 and the shaft 16.

Fitted over the upper portion of the rotating shaft 16 is a snap ring 26. This snap ring 26 is brought into contact with a washer 24 seated in a washer seat 22 provided in the stator housing 20.

The stator 28 of the above brushless motor includes a stator housing 20 which is fitted into the center of a circuit board 30 so that it partially projects upwardly. The housing 20 projects out of the top of the circuit board 30, while the rotating shaft 16 extending in the stator housing 28 projects out of the top of the housing 20. In the circuit board 30, a drive coil 36 corresponding to the main magnet 12 is wound on a stator core 34. A magnetic resistor 38 corresponding to the frequency generating magnet 14 is mounted on the bottom surface of the circuit board 30.

Turning to FIG. 2, the integrated housing 20 has a center through hale 40. The washer seat 22 is formed in the top end of the through hole 40. Please note that FIG. 2 shows the housing 20 inverted from the state of FIG. 1.

Bearing seat stops 41 of top and bottom metal bearings 42 are formed in the upper and lower portions of the center through hole 40 of the housing 20 respectively. The housing 20 also includes a plurality of outside through bolt holes 44 which are vertically formed about the center through hole 40. The outside through holes 44 are circularly arranged in the housing 20 at regular intervals.

In the operation of the above brushless motor, the drive coil 36 of the stator core 34 is applied with electric current (DC). The rotor case 10 thus rotates due to the interaction between the rotating magnetic field formed by the drive coil 36 and the DC magnetic field formed by the main magnet 12 of the rotor case 10. The rotating shaft 16 thus rotates. Additionally, the magnetic resisting device 38 senses the signals generated by the frequency generating magnet 14 of the rotor case 10 and thereby controls the rotating velocity of the motor to maintain a constant velocity of the motor.

The rotating motion of the rotating shaft 16 in the housing 20 is supported by the top and bottom bearings 42. In order to allow smooth rotation of the motor, the centers of top and bottom bearings 42 should be correctly aligned with each other. In addition, the radial surface of each bearing 42 should be exactly perpendicular to the central axis of the rotating shaft 16. Because this is difficult to achieve with separable housings, an integrated housing, as shown, is preferred.

In order to correctly place the bearings 42 in the housing 20 relative to the shaft 16, the housing 20 should be correctly sized. Otherwise stated, the size of the bearing seat steps 41 formed in the through hole 42 for seating the top and bottom bearings 42 should be fitted to the outer size of the bearings 42. FIG. 2 shows the bearings 42 fitted in the housing 20.

However, the bearing seat steps 41 of the housing 20 may be deformed due to the difference of cooling time and of shrinkage between thick parts and thin parts of the housing 20 when cooling the melted resin during formation of the housing 20 by molding. Due to the above deformation of the bearing seat steps 41 of the housing 20, the bearings 42 may not be correctly seated in the housing 20. When the bearings 42 are not correctly seated in the housing 20 as described above, the rotating shaft 16 will eccentrically rotate in the housing 20. Such an eccentric rotation of the shaft 16 prevents smooth rotation of the motor and shortens the expected life span of the motor, thereby deteriorating the operational performance of the goods having the above brushless motor.

SUMMARY OF THE INVENTION

It is, therefore, an object of the invention to provide a bearing support for a cylindrical rotating shaft bearing of brushless motor in which the above problems can be overcome and which is provided with holes formed in thick parts of a stator housing of the motor to thereby prevent shrinkage of the thick parts of the housing when forming the housing through injection molding, the holes being formed in the stator housing by appropriately positioning cores in the mold before injecting melted resin into the mold.

In order to accomplish the above object, the present invention provides a brushless motor comprising a rotating shaft bearing and a housing for seating the bearing therein, further comprising: holes adapted for preventing a size deformation of the housing when forming the housing through injection molding, the holes being formed in a bearing seat mouth of the housing as well as in an outer portion of the mouth.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a sectional view of a stator housing of a brushless motor in accordance with a preferred embodiment of the present invention; and FIG. 5 is a sectional view of the stator housing taken along lines 5—5 of FIG. 4, showing weight reducing holes formed in the housing to prevent deformation of the housing due to shrinkage.

FIG. 6 is a sectional view of the stator housing, taken along lines 6—6 of FIG. 4.

DESCRIPTION OF THE PREFERRED EMBODIMENTS

Figure 1:
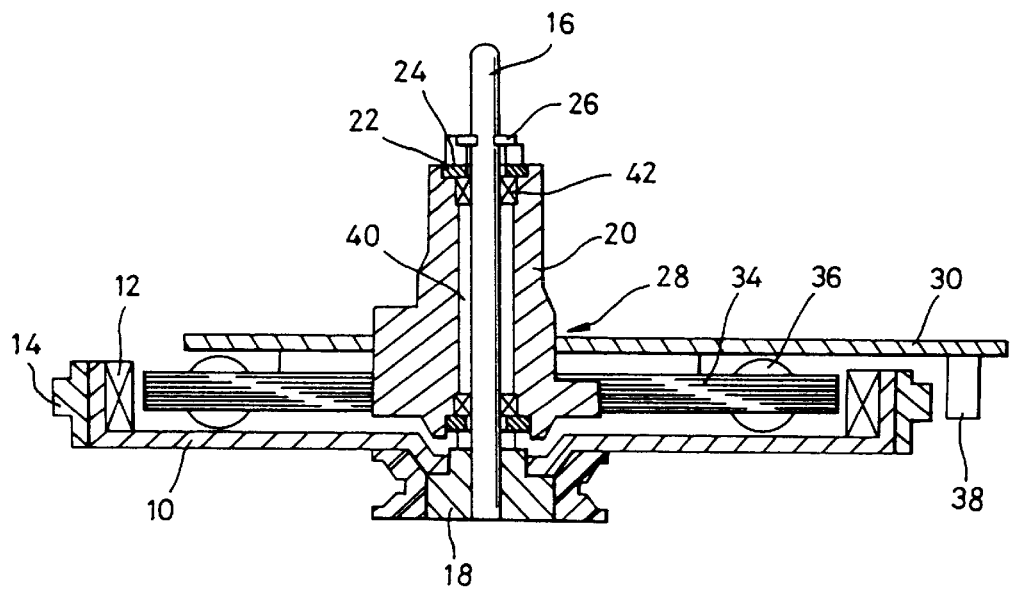
FIG. 1 is a sectional view of a typical brushless motor.
Figure 2:
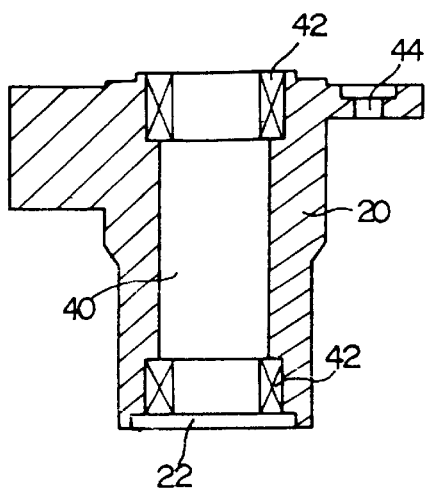
FIG. 2 is a sectional view of a stator housing showing top and bottom metal bearings fitted in the housing.
Figure 3:
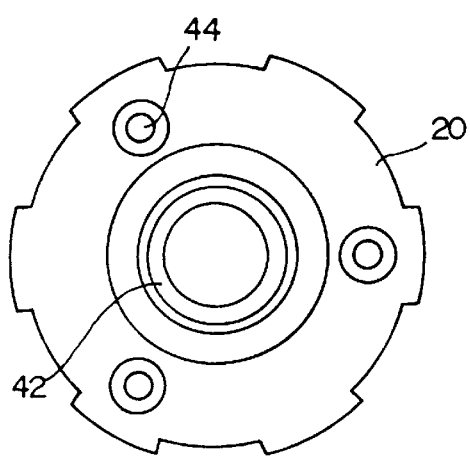
FIG. 3 is a plan view of the stator housing of FIG. 2, showing the metal bearings fitted in the housing.

FIGS. 4 through 6 show a brushless motor in accordance with a preferred embodiment of the present invention. In the present invention, the housing 60 is formed through injection molding. The center of the above housing 60 is provided with a penetrating hole 62. A rotating shaft will be longitudinally received in the center of penetrating hole 62 in the same manner a described for the prior art brushless motor of FIG. 1. Bearing seating steps 71 are mounted around the circumference of both mouths 70, 72 of penetrating hole 62 to receive the respective metal bearings 41.

As shown in FIG. 4, at least one cavity 74, and preferably a plurality of axial cavities 76, is formed in the top surface of the housing 60 between the upper portion of the center through hole 62 and the outside through holes 44. Additionally, a plurality of axial holes 78 are formed around the inner circumference 80 of the penetrating hole 62. The arrangement of the cavities 76 and axial holes 78 formed in the housing 60 are best seen in the plan view of FIG. 5 while the arrangement of axial holes 78 are best seen in FIG. 6. The cavities 76 and axial holes 78 may be formed by appropriately positioning cores in predetermined places in a mold before injecting melted resin into the mold.

In this invention, it is preferred to let the height of the cavities 76 be equal to or longer than the vertical height of a bearing 42. In this case, the bearing seating steps formed in the housing 60 for seating the top and bottom bearings 42 the?rein can have correct size.

As shown in FIG. 5, a plurality of ribs 82 are formed between cavities 76. The number and thickness of the ribs 82 need not be deferred. Their width may be varied in conformity with the cavities 76 as long as the integrity of seating steps 41 is maintained so that bearings 42 can sufficiently support the rotating shaft.

In accordance with the present invention, an appropriate number of cavities 76 having a given height are formed in the stator housing 60 of the brushless motor. Due to the cavities 76, the amount of melted resin to be injected into the mold can be reduced and thereby substantially reduces the difference of cooling time between the thick and thin parts of he housing 60. Therefore, the housing 60 can be uniformly formed through the injection molding to prevent the deformation of the inside diameter of the housing 60 manufactured by means of molding.

As the above housing formed in accordance with the invention has the precise measurement due to the cavities 76, the motor elements such as the metal bearings 42 can be precisely seated in the housing 60. Therefore, the brushless motor of this invention can achieve operational precision.

Due to the cavities 76, it is possible to form a housing 60 having a correct size within a short time. In accordance with an experiment of this applicant, the stator housing of this invention was formed within about 15 seconds which are substantially shorter than the prior art forming time, 50 seconds.

As described above, the present invention forms a precise stator housing of a brushless motor within a relatively short time. Therefore, the invention improves the assembling accuracy of the brushless motor and thereby remarkably improves the quality of the brushless motor. The present invention not only saves processing time and raw materials of the housing, but also reduces the inferiority rate of the brushless motor. The invention thus cuts down the cost of the brushless motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bearing support for seating a cylindrical rotating shaft bearing of a motor, comprising: an injection molded body with a cylindrical bearing seat mouth adapted to receive said rotating shaft bearing, and means for preventing a size deformation of said injection molded body when cooling the body formed by injection molding, said deformation tending to occur as a result of differences in cooling time between said portions of different thickness, said size deformation preventing means including at least one cavity formed only in a portion of said body adjacent said cylindrical bearing seat, said portion having a thickness greater than a remaining portion of said body.

2. The bearing support of claim 1, further comprising a through hole coextensive with the cylindrical bearing seat mouth to receive a rotating shaft of the motor.

3. The bearing support of claim 2, wherein the at least one cavity comprises a plurality of axial cavities formed in said body adjacent to and spaced about a circumference of said cylindrical bearing seat.

4. The bearing support of claim 1, wherein a height of said at least one cavity is about equal to or greater than a height of said bearing.

5. An integrated housing of a rotatable brushless motor manufactured by molding, comprising:

a molded resin integrated body having a through hole and bearing seating steps respectively formed around opposite ends of the through hole, said integrated body further including a means for preventing a size deformation of said body when cooling the body formed by molding, said size deformation preventing means including a plurality of axial holes formed around at least one of said bearing seating steps to prevent said housing from being deformed while cooling the molded integrated body, said axial holes being formed in a portion of the body formed around said at least one said bearing steps and which portion has a thickness greater than remaining portions of said body which are not formed around said at least one of said bearing seating steps.

6. The integrated housing of claim 5, wherein a height of said axial holes are about equal to a height of a bearing received in one said bearing seating step.

7. The integrated housing of claim 5, further comprising a plurality of ribs between respective ones of said axial holes to strengthen said at least one of said bearing seating steps.

8. The integrated housing of claim 7, wherein the plurality of ribs are arranged circumferentially at predetermined intervals about said bearing seating step.

* * * * *